US00RE37800E

(19) United States
(12) Reissued Patent
Uemura

(10) Patent Number: US RE37,800 E
(45) Date of Reissued Patent: Jul. 23, 2002

(54) INDUCTION HEATED STEAM GENERATING SYSTEM

(75) Inventor: Motoaki Uemura, Osaka (JP)

(73) Assignees: Daihan Co., Ltd., Kita-Ku (JP); Robert K. Yuan, Kesington, CA (US)

(21) Appl. No.: 09/607,341

(22) Filed: Jun. 30, 2000

Related U.S. Patent Documents

Reissue of:
(64) Patent No.: 5,773,797
Issued: Jun. 30, 1998
Appl. No.: 08/733,868
Filed: Oct. 18, 1996

(51) Int. Cl.[7] ..... H05B 6/10
(52) U.S. Cl. ..... 219/628; 219/629; 219/656; 392/450
(58) Field of Search ..... 219/628, 629, 219/630, 632, 677, 687, 688, 656, 635, 651, 772; 392/450, 445

(56) References Cited

U.S. PATENT DOCUMENTS

| | | | | | |
|---|---|---|---|---|---|
| 1,346,741 | A | * | 7/1920 | Colvin | 219/628 |
| 1,839,764 | A | * | 1/1932 | Kittredge et al. | 219/630 |
| 2,513,379 | A | * | 7/1950 | Bailey | 219/628 |
| 2,622,184 | A | * | 12/1952 | Johneas | 219/628 |
| 2,834,865 | A | * | 5/1958 | Coates | 392/450 |
| 3,784,449 | A | * | 1/1974 | Merrill | 202/180 |
| 4,341,936 | A | * | 7/1982 | Virgin | 219/630 |
| 4,431,890 | A | * | 2/1984 | Ramer | 219/628 |
| 4,601,263 | A | * | 7/1986 | Shieh | 392/450 |
| 5,237,144 | A | * | 8/1993 | Iguchi | 219/628 |
| 5,262,621 | A | * | 11/1993 | Hu et al. | 219/628 |

FOREIGN PATENT DOCUMENTS

| | | | | |
|---|---|---|---|---|
| DE | 2 231 568 | * | 1/1974 | 219/630 |
| GB | 607530 | * | 9/1984 | 219/628 |
| JP | 62-200119 | * | 9/1987 | 219/635 |
| JP | 4-230987 | | 8/1992 | |
| SU | 879183 | * | 11/1981 | 219/628 |

* cited by examiner

*Primary Examiner*—Philip H. Leung
(74) *Attorney, Agent, or Firm*—Sughrue Mion, PLLC

(57) ABSTRACT

The steam generating system utilizing a first container having a liquid chamber. The first container is surrounded by a conducting coil for generating a field and producing eddy currents on the container. Steam produced in the first container is sent to a second container which is similarly heated by an induced eddy current. Steam in the second container is superheated for use.

10 Claims, 4 Drawing Sheets

INDUCTION HEATED STEAM GENERATING SYSTEM

Matter enclosed in heavy brackets [ ] appears in the original patent but forms no part of this reissue specification; matter printed in italics indicates the additions made by reissue.

BACKGROUND OF THE INVENTION

The present invention relates to a novel and useful steam generating system.

Steam is currently generated from liquid water by the use of oil, gas, coal, or other fuel in pressurized heat exchanged vessels. The pressure within such vessels normally runs 20 to 60 atmospheres. These prior steam generators are systems typically found on ocean going vessels and are quite large and cumbersome.

Natural gas fired or resistance electric heater systems have also been devised to produce superheated steam. Such systems are generally slow and inefficient.

In the past, induction heaters have been employed in furnaces to heat a metallic charge within a refractory crucible. Such furnaces are surrounded by a water cooled copper coil which receives power in the form of alternating current varying from 60 hertz to 500,000 hertz, or even higher frequencies which are derived from oscillators. Essentially, the molten charge within such induction furnace is heated by the interaction of eddy currents produced by a high frequency field. Moreover, the molten charge is considered to be the secondary of a transformer.

Unfortunately, the past systems have either required extensive and expensive equipment to produce superheated steam at very high pressures.

A steam generating system which produces superheated steam at or near atmospheric pressure would be a notable advance in the industrial arts.

SUMMARY OF THE INVENTION

In accordance with the present invention a novel and useful steam generating system is herein provided.

The steam generating system includes a first container which is provided with a first chamber for a liquid to be converted into steam. Such liquid may be water, ammonia, and the like. The chamber includes an inlet and an outlet. A reservoir of water communicates with the inlet of the first container such that liquid is provided therein at a steady rate, commensurate with the generation of steam within the container. The container also includes a tank wall portion or shell which is capable of being heated by electrically induced eddy currents. In most cases, the wall portion may be a metallic member such as copper, silver, aluminum, and the like. However, other materials may be employed which are capable of performing this function. In certain cases, metallic shells having a mask of other metallic materials may be employed. For example, a combination of a copper shell and an iron mask suffices, in this regard.

The system of the present invention also includes a first coil which at least partially surrounds the first container. The first coil may be a metallic member or one which is composed of a material which conducts electricity and is capable of producing a field around the container. The first coil may also be cooled by the passage of liquid therethrough. In this respect, such cooling helps maintain the strength of the electromagnetic field produced by the coil, which will be discussed hereinafter.

An insulation layer may also be found, in the present invention, sandwiched between the first coil and the wall portion of the first container. Such insulation layer is also cooled by the coil which is normally heated by heat radiating from the container. In essence, eddy currents created within the metallic tank by the electro-magnetic field produced by the coil heats the tank through the Joule effect. Radiated heat from the tank travels inwardly and heats upon the liquid within the chamber into steam. The steam is raised to a desired temperature for use. In certain cases, steam may be superheated within the first container.

First electric means generates a magnetic field at the first coil and an eddy current at the first container tank wall portion. The first electric means in the form of a high frequency AC power source produces a frequency which may be typically [250,000] 25 kilohertz. However, any high frequency can be utilized in the power source of the present invention.

A second container is also employed in one of the embodiments of the present invention. Again, the second container is similarly constructed to the first container. That is, the second container includes a chamber, an inlet, and outlet, and a tank wall portion capable of being heated by an induction eddy current. A second coil surrounds the second chamber and is connected to second electric means for generating a field in the second coil and an eddy current at the second container. Conduit means transports steam from the first container outlet to the second container inlet. The induction heating accomplished in the second container superheats steam at approximately atmospheric pressure. Thus, superheated steam passes from the second container and may be employed to heat any item such as foodstuffs, metals, and the like.

It may be apparent that a novel and useful steam generating system has been described.

It is therefore an object of the present invention to produce a steam generating system which capable of producing superheated steam at or about atmospheric pressure.

Another object of the present invention is to provide a steam generating system which employs induction heating and avoids the expense and bulk of equipment used in prior superheated steam generating systems.

Another object of the present invention is to provide a steam generating system which is compact and may be easily used in confined spaces.

A further advantage of the present invention is to provide a steam generating system which is highly efficient and uses an induction and heating element having a high frequency power source.

Another object of the present invention is to provide a steam generating system which eliminates fire hazards, since the outer surfaces of the equipment employed in the present invention are normally cool to the touch.

The invention possesses other objects and advantages especially as concerns particular characteristics and features thereof which will become apparent as the specification continues.

For a better understanding of the invention reference is made to the following detailed description of the preferred embodiments thereof which should be taken in conjunction with the prior described drawings.

DETAILED DESCRIPTION OF THE PREFERRED EMBODIMENTS

Various aspects of the present invention will evolve from the following detailed description of the preferred embodiments which should be referenced to the hereinabove delineated drawings.

Figure 2:
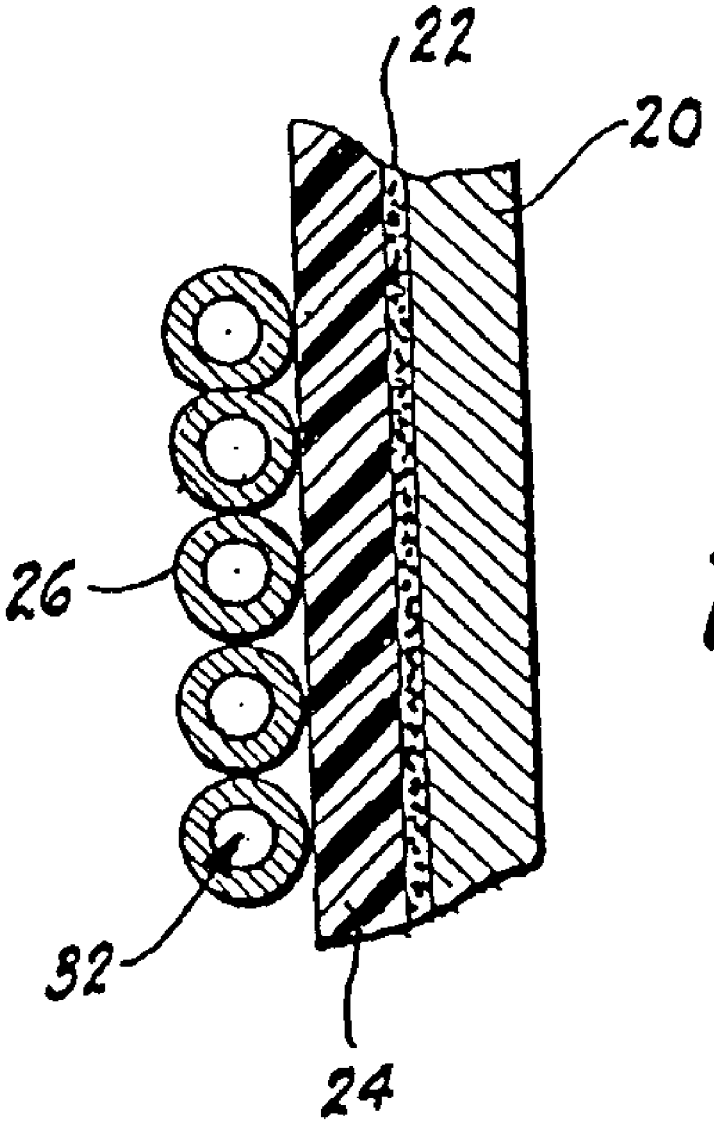
FIG. 2 is a sectional view taken along line 2—2 of FIG. 1.

The invention as a whole is depicted in the drawings by reference character 10. The steam generating system 10 includes as one of its elements a first container 12. The first container 12 is formed with a chamber 14 which contains liquid charge 16 that is converted into steam 18. Liquid charge 16 may be water, ammonia, freon, and other known compositions which are typically used in industrial sectors. First container 12 includes a tank 20 which may be composed of metallic material such as copper, silver, aluminum, and the like. With reference to FIG. 2, it may be observed that tank 20 is a metallic member having a mask layer 22 of powdered metallic material such as iron. It should be noted, that other materials may be employed for tank 20 as long as they are capable of being heated by an induction eddy current, which will be discussed hereinafter. Also, insulation layer 24 is shown in the drawings as surrounding tank 20 and mask layer 22. Insulation layer 24 helps to contain the heat within first container 12, specifically tank 20, and reduces fire and safety hazards since the outer surface of container 12 is generally cool to the touch. Insulation layer 24 may be composed of any suitable material, commensurate with the characteristics of tank wall portion 20 and mask 22.

Figure 1:
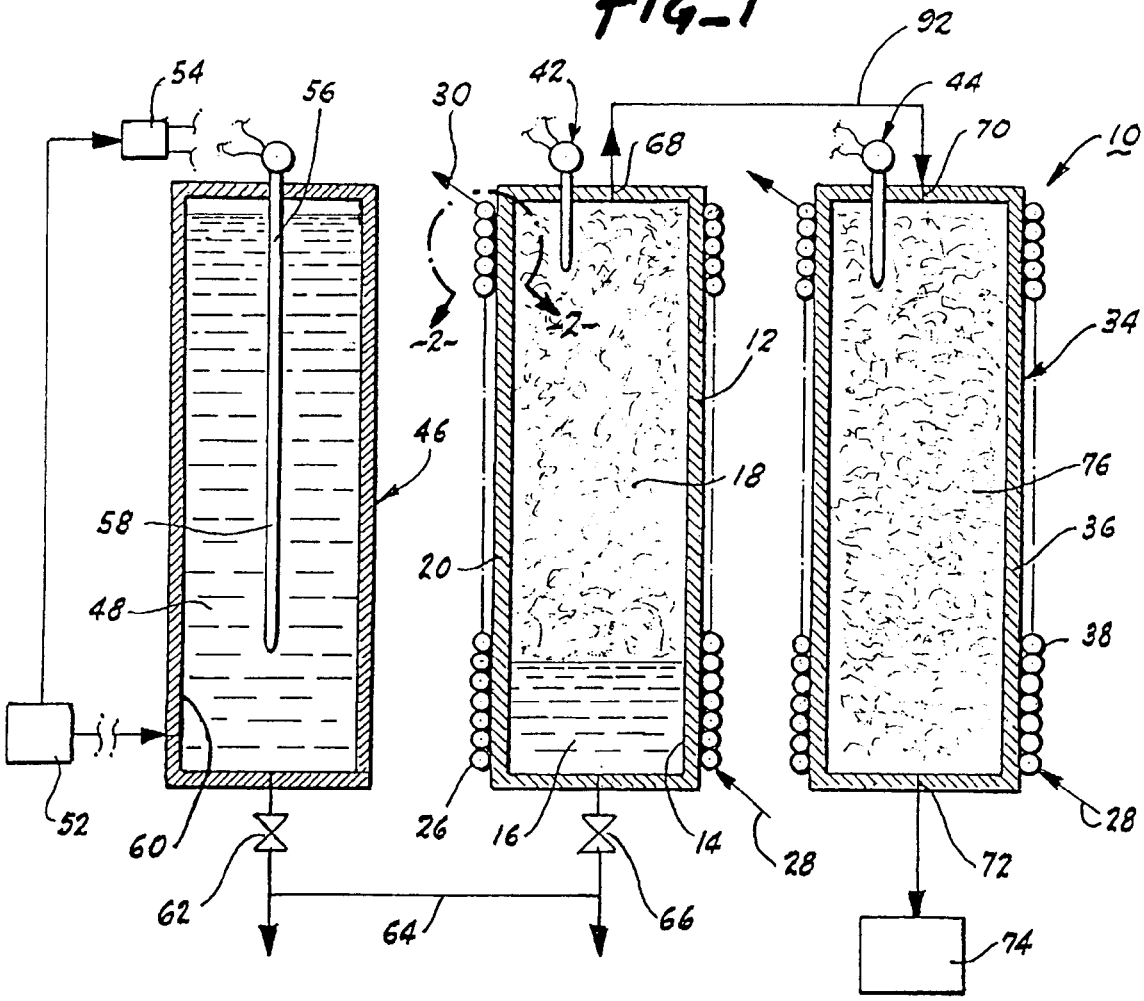
FIG. 1 is a sectional view showing an overall arrangement of the steam generating system of present invention with the supporting conduits depicted in schematic rendition.

The present invention also entails a first coil 26 which at least partially surrounds first container 12. As depicted in FIGS. 1 and 2, first coil 26 spirals around container 12 and is capable of carrying a cooling fluid therewithin. Directional arrows 28 and 30, FIG. 1 as well as directional arrow 31 of FIG. 2 depicts the flow pattern through the first coil 26. First coil 26 is also composed of a material which is capable of conducting electrical currents such as copper, steel, and the like. Coil 26 also helps to cool insulation layer 24 adjacent tank wall portion 20.

Figure 3:
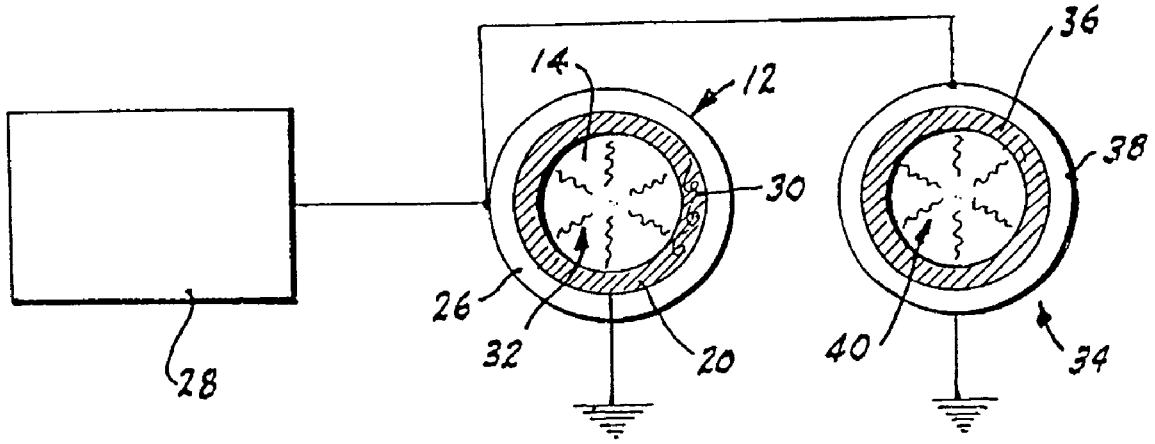
FIG. 3 is a schematic overlay of the high frequency alternating current system for generating electromagnetic field in the tandem containers of the present invention.

First electric means 28 generates an electromagnetic field in first coil 26, FIG. 3. First coil 26 is suitably connected to first electric means 28, i.e., by crimping. First electric means comprises a high frequency AC power source having a frequency of approximately [250,000] *25* KHz. However, any high frequency may be employed in this regard. When high frequency power is supplied by first electric means 28, to coil 26, eddy currents 30 are generated in the wall portion of metallic tank 20. Through the Joule effect, the temperature of tank 20 is raised to a certain degree. At this point, heat is radiated from tank 20, represented by rays 32, into chamber 14 of first container 12. As may be observed in FIG. 1, water body 16 is then turned into steam 18 by this expedient.

Turning again to FIG. 1, it should be apparent that a second container 34 is also found in the present invention. Second container includes a tank wall portion 36 of metallic material, essentially similar to that found in first container 12. Thus, the structure of first container 12 found in FIG. 1 and herein before described, also applies to second container 34. Second coil 38 spirals around second container 34 and is connected to AC power source 28 as depicted in FIG. 3. Radiation rays 40 represent the radiation of heat from tank wall portion 36 by the induction heating process described with respect to container 12.

Turning again to FIG. 1, it may be observed that containers 12 and 34 include temperature monitors 42 and 44, respectively. Such temperature monitors may produce a temperature signal which is processed in a conventional controller (not shown).

Reservoir 46 is also found in the present invention for providing liquid 48 therewithin to the inlet 50 of container 12. Pump 52 may be controlled by a level controller 54 of conventional configuration. Level controller 54 obtains a level signal from level meter 56 having a probe 58 within chamber 60 of reservoir 46. Valves 62 permits water to pass from tank 20 to inlet 50 of container 12. Of course, such liquid feed may be through gravity, pumps, and the like. FIG. 1 represents this movement through a conduit 64 in a schematic manner. Valve 66 permits the entrance of liquid 48 into container 12 through inlet 50 thereof. Container 12 includes an outlet 68 which permits steam to exit chamber 14 of container 12 and to enter inlet 70 of container 34. Such steam is generally superheated by the induction heating mechanism associated with container 34. Outlet 72 of container 34 passes superheated steam to the ultimate use for such steam, which may be a steam chamber 74.

Figure 4:
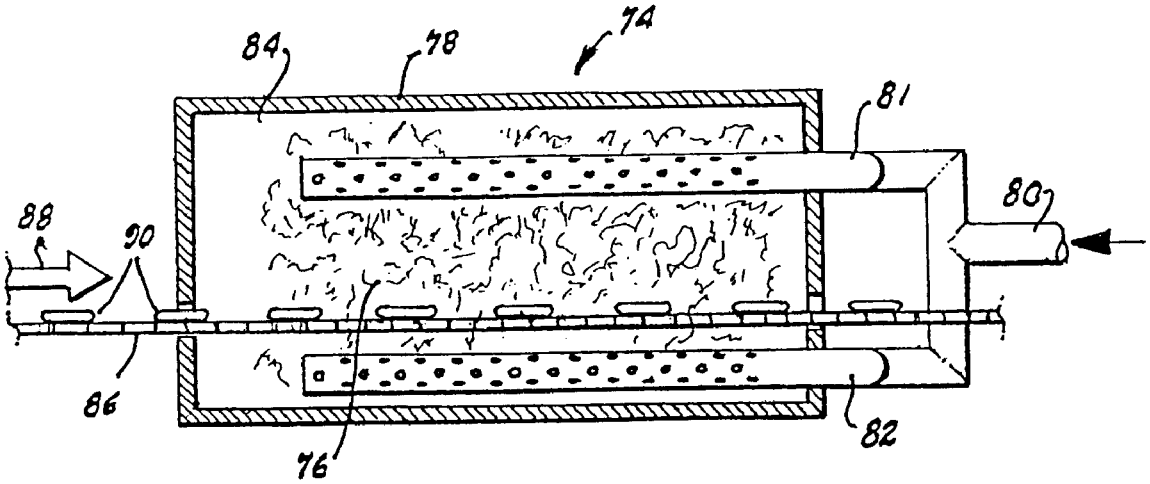
FIG. 4 is a sectional view depicting a typical steam chamber being fed by the outlet of the second container.

FIG. 4 represents steam chamber 74 as a typical ultimate use for the superheated steam 76 exiting container 34. However, superheated steam 76 may find multiple uses. Steam chamber 74 includes a housing 78. Conduit 80 from outlet 72 of container 34 feeds nozzles or spargers 80 and 82 which extend into the interior chamber 84 of housing 78. A conveyor 86 moves according to directional arrow 88 and carries foodstuffs 90 through chamber 84 and into contact with superheated steam 76 therewithin. Foodstuffs 90 exit chamber 84 and are used or packaged as desired.

In operation, liquid 48 within reservoir 46 is fed to inlet 50 of container 12. First coil 26 is connected to electric means in the form of a high frequency AC power source produces an electromagnetic field around tank 20. Through the Joule effect, tank 20 is heated and radiates heat inwardly to chamber 14 of container 12. Water body 16 within chamber 14 is heated into steam 18. Steam 18 passes from container 12 through conduit 92 and into inlet 70 of second container 34. A like heating effect takes place through the electrical energizing of coil 38, which turns saturated steam 18 from first container 12 into superheated steam 76. Superheated steam 76 passes through outlet 72 of second container 34 for use, represented by steam chamber 74. First and second coils 26 and 38 are cooled by water or other fluids passing therethrough. Also, containers 12 and 34 include insulation layers, such as insulation layer 24 with respect to container 12, to contain the heat within containers 12 and 34.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A steam generating system comprising:

a. a first container, said first container including a chamber for a liquid said first chamber including an inlet and an outlet, said first container further including wall portion, said wall portion comprising a tank surrounded by a mask of material heated by an induction eddy current, said wall portion further including a layer of insulation surrounding said tank and mask of material;

b. a first coil at least partially surrounding said first container;

c. first electric means for generating a field in said first coil and an eddy current at said first container wall to produce steam in said first container chamber;

d. a second container, said second container including a chamber, said second container including an inlet and an outlet, said second container further including a wall portion, said wall portion comprising a tank surrounded by a mask of material heated by an induction eddy current, said wall portion further including a layer of insulation surrounding said tank and mask of material;

e. a second coil at least partially surrounding said second container;

f. conduit means for transporting steam from said first container chamber outlet to said second chamber inlet; and g. second electric means for generating a field in said second coil and an eddy current at said second container wall portion to produce super heated steam.

2. The steam generating system of claim 1 in which first container tank is metallic.

3. The steam generating system of claim 2 in which said second container tank is metallic.

4. The steam generating system of claim 1 in which said first container mask includes a ferrous mask.

5. The steam generating system of claim 4 in which said second container mask includes a ferrous mask.

6. The steam generating system of claim 1 in which said first and second coils include cooling means for controlling the temperature of said first and second coils.

7. The steam generating system of claim 1 which additionally comprises a nozzle connected to the outlet of said second container.

8. The steam generating system of claim 1 which additionally comprises a reservoir of liquid and transporting means for delivering the liquid to said first container.

9. The steam generating system of claim 8 which additionally comprises control means for determining the level of liquid in said reservoir.

10. The steam generating system of claim 1 in which said first and second electric means each comprise a high frequency AC power source.

* * * * *